INVENTOR.
George W. Jackson
BY
J. C. Evans
ATTORNEY

United States Patent Office 3,558,156
Patented Jan. 26, 1971

3,558,156
AUTOMATIC VEHICLE LEVELING SYSTEM IN-
CLUDING ELECTRICALLY OPERATED PUMP
DOWN COMPRESSOR
George W. Jackson, Dayton, Ohio, assignor to General
Motors Corporation, Detroit, Mich., a corporation of
Delaware
Filed May 1, 1969, Ser. No. 820,970
Int. Cl. B60g *11/56*
U.S. Cl. 280—124                4 Claims

ABSTRACT OF THE DISCLOSURE

In preferred form, an automatic vehicle leveling system including a fluid spring between the chassis and the axle assembly that is selectively connected to a precharged pressure tank through a closed loop supply system including a height controller having three position valve means. An electrically operated compressor within the storage tank in cooperation with the multi-position height controller produces a rapid pump down of the fluid spring when static load is removed. Concurrently the compressor will precharge the tank for subsequent leveling use when the vehicle chassis is loaded.

This invention relates to automatically operated vehicle leveling systems and more particularly to such systems that include a pressure source connected to a pressurizable auxiliary fluid spring component through a closed loop system operated under the control of a height responsive controller.

Vehicle leveling systems have three basic components. One of the components is a pressurizable fluid spring unit that supplements the load carrying capacity off a primary suspension spring so as to return the vehicle to a level position following changes in static load on the vehicle. Another basic component is a pressure source that is connected to the pressurizable fluid spring. Still another basic component is a height responsive controller unit that will fill the spring component with pressurized fluid to produce load carrying capacity and that will exhaust pressurized fluid from the spring component when the static vehicle load is removed from the vehicle to reduce load carrying capacity.

In such systems one approach is to maintain the three basic components in an open system. The pressure source includes a compressor that continually draws ambient air into the system and compresses it for use in the spring component. The spring component is also exhausted directly back to ambient. Since the system is open there is a problem of introducing dirt, moisture and other undesirable matter into the system.

A second approach that overcomes the open system problem is to maintain a closed loop fluid flow system between the pressure source and the pressurizable fluid spring component. Such systems can be further self-contained by the provision of an electric motor driven compressor isolation mounted within a storage tank in the system. This eliminates belt drives and running seals in the system.

The provision of an electrically operated compressor in such systems replaces systems of the type that include a vacuum operated piston cylinder compressor. Such a compressor has its power chambers connected to the intake manifold of the vehicle engine and is operated to produce a high pressure source in a pressurized container.

Examples of closed loop type systems are set forth in U.S. Pat. No. 3,339,910 issued Sept. 8, 1967 to Jackson and U.S. Pat. No. 3,372,919 issued Mar. 12, 1968 to Jackson. A representative open system is shown in U.S. Pat. No. 3,285,617 issued Nov. 15, 1966 to Jackson.

An object of the present invention is to reduce the time required to automatically level a vehicle by means of a closed loop automatic leveling system having a pressurizable spring component that acts as an auxiliary spring to the primary suspension spring of a vehicle and to do so by means of a damped mechanically operated fluid flow controller and fluid pressure sensitive electric switch means that coact to limit system operation except in response to changes in static vehicle loads.

Still another object of the present invention is to improve automatic leveling systems for motor vehicles of the type including a pressurizable auxiliary fluid spring component that is connected by a three position mechanically operated height controller to a source of pressure by further including an electrically motor operated compressor in a hermetically sealed storage tank, the compressor outlet being in direct communication with the interior of the tank and the compressor inlet being connected to the three position height controller by means including a pressure sensing electrical switch component that operates the compressor when the height controller, in response to changes in static load is conditioned to supercharge the compressor intake for rapidly pumping down the fluid spring component.

Yet another object of the present invention is to improve automatically operated vehicle leveling systems including a closed loop in part formed by a pressurizable auxiliary fluid spring unit that supplements the load carrying capacity of a primary spring to maintain a vehicle in a level position by including a pressure source in the loop defined by an electrically motor driven compressor sealed within a tank; the compressor outlet connected in direct communication with the interior of the tank and the compressor inlet connected by a mechanically operated three position height controller and a pressure sensitive electrical switch component to the auxiliary fluid spring to control the level of pressurization in the auxiliary spring component for vehicle leveling.

Another object of the present invention is to provide a reliable closed loop type automatic leveling system of the type including a pressurizable auxiliary spring component and a source of pressure operated under the control of a three position mechanically operated controller that senses the relative height relationship between a vehicle chassis and its axle assembly by the provision of means located in fluid circuit between the pressure source and the three position height controller defining an inlet path to a compressor; said means including a pressure sensitive electrical switch completes an energization circuit for an electric motor driving the compressor to supply the pressure source and wherein the three position height controller and the inlet path defining means serves to supercharge the compressor intake during operation thereof to reduce the time required ot level an associated vehicle.

In one working embodiment of the present invention to attain the above and other objects, a storage tank has a spring mounted electric motor driven compressor therein with its outlet in direct communication with the tank interior and an inlet connected to a passageway formed in part by a movable diaphragm in a pressure responsive electrical switch. The passageway is in communication with an exhaust conduit connected to the outlet of a mechanically operated height controller in communication with a pressurizable control chamber of a combination shock absorber and air spring unit. A supply conduit connects an inlet of the controller with the tank interior.

A cross-over tube connects the chamber of the above mentioned air spring unit with a like chamber in a second combination shock absorber and air spring unit.

Under level conditions the height controller isolates the pressurizable control chambers of the air spring units from the remainder of the closed loop system.

When the vehicle is loaded and primary springs are compressed to cause the chassis to move below a desired trim height position the mechanically operated controller directly communicates the supply conduit with the control chambers of the air spring units. Precharged compressed air in the tank immediately pressurizes the control chambers of the air spring units to return the vehicle to a level position where the height control blocks the spring component from the remainder of the system. During both neutral and charging phases of operation the electrical switch component is conditioned to prevent energization of an electric drive motor that operates the compressor within the canister.

Under conditions where the vehicle chassis moves above its desired trim height relationship the height controller operates to block communication between the tank interior and the control chambers and concurrently communicates the control chambers of the air spring components with the exhaust conduit. The movable diaphragm senses a predetermined pressure increase in the exhaust conduit to complete the energization circuit for the electric drive motor of the compressor. Furthermore, the high pressure in the air spring units supercharges the intake of the compressor during energization of the drive motor whereby the system is rapidly pumped down for returning the vehicle to its level position.

Further objects and advantages of the present invention will be apparent from the following description, reference being had to the accompanying drawings wherein preferred embodiments of the present invention are clearly shown.

Figure 1:
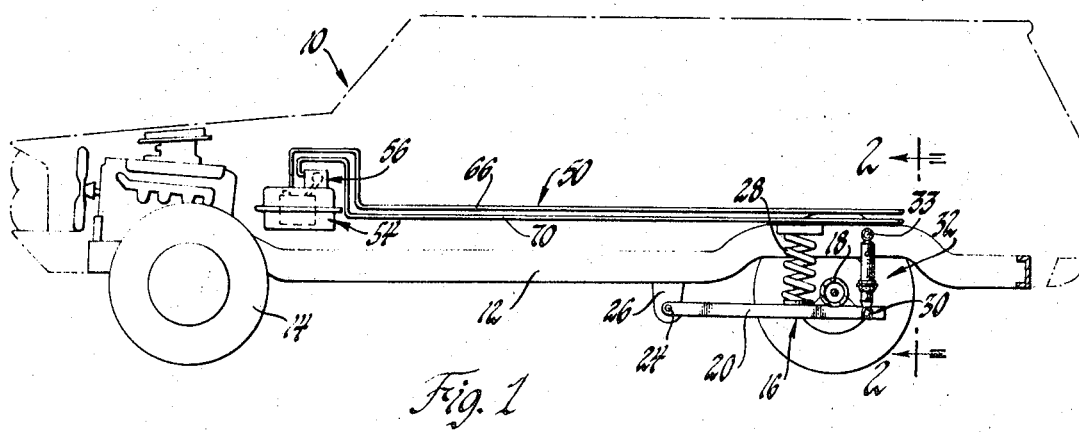
FIG. 1 is a diagrammatic view showing the layout of a closed loop automatic leveling system in accordance with the present invention arranged with respect to a vehicle axle and chassis.

In FIG. 1 of the drawings a vehicle 10 is illustrated having a lower frame 12 with a front end supported by suspension components (not shown) to a pair of front wheel assemblies 14.

The vehicle is automatically leveled by moving the rear of the lower frame 12 with respect to a ground supported rear axle assembly 16. It includes an axle housing 18 which is fixedly secured to a pair of spaced apart control arms 20, 22. Each of the control arms has one end thereof directed toward the front of the car pivotally secured by a pin 24 to a bracket 26 depending from the lower frame 12.

A primary coil suspension spring 28 is carried on each of the control arms 20, 22 between the connector pin 24 and the axle housing 18 to support the vehicle 10 at the lower frame member 12.

The end of the control arm 20 that is located rearwardly of the axle housing 18 is connected by a pin 30 to the lower mounting bracket of an auxiliary suspension unit 32 that has its upper mount connected by pin 33 to frame 12 to supplement the load carrying capacity of an adjacent one of the primary coil suspension springs 28.

Figure 2:
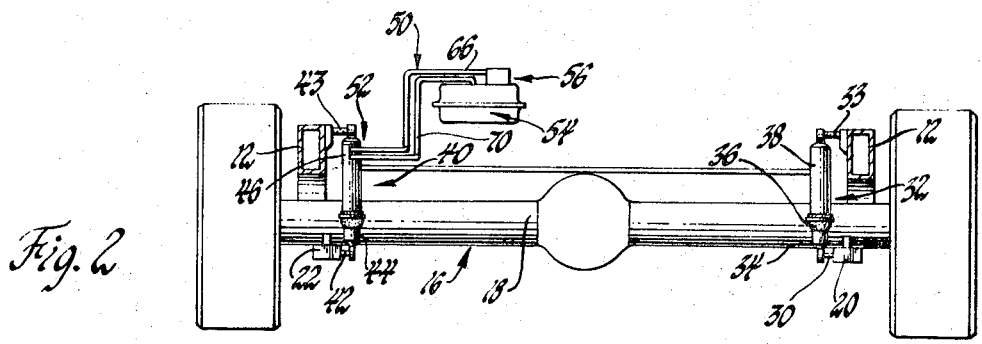
FIG. 2 is a vertical sectional view taken along the lines 2—2 of FIG. 1 looking in the direction of the arrows; and, FIG. 3 is an enlarged somewhat diagrammatic view partially broken away of the component parts of the inventive system in FIG. 1.

In the illustrated arrangement the auxiliary suspension unit 32 includes a double direct acting hydraulic shock absorber 34 that carries a flexible sleeve 36 between relatively movable portions thereof to form a pressurizable air spring component 38 that is arranged generally concentrically of the double direct acting hydraulic shock absorber 34 to define a pressurizable control chamber 39 into which pressurized air can be directed and exhausted to produce an uplifting force on the lower frame 12 at the right side of the axle housing 18 as seen in FIG. 2 for leveling the vehicle under conditions when the adjacent primary coil suspension spring 28 is deflected.

A second auxiliary suspension unit 40 has a lower mounting bracket thereon connected by a pin 42 to the rearwardly located end of the control arm 22. Its upper bracket is converted by a pin 43 to frame 12. The unit 40 further includes a double direct acting hydraulic shock absorber 44 and a pressurizable air spring component 46 corresponding to like parts of the unit 32. The pressurizable control chamber 47 of the air spring 46 is in direct communication with that of the air spring 38 through a cross-over tube 48.

The auxiliary suspension units 32, 40 are of a type more particularly set forth in U.S. Pat. No. 3,063,701 to Paul Long, issued Nov. 13, 1962. The details of the combination shock absorber and air spring unit form no part of the present invention and it should be clearly understood that other auxiliary load supplementing components such as a bellows or inflatable air bags located adjacent the primary coil spring would be equally suited for use with the present invention.

The flow of pressurized fluid into and out of the auxiliary suspension units 32, 40 is controlled by a closed loop system 50 constructed and arranged in accordance with the present invention. In includes a mechanically operated height controller 52 mounted on the side of air spring component 46; an air pressure storage tank or container 54 and a pressure sensitive switch assembly 56 connected between the tank 54 and the mechanically operated height controller 52 and operative in response to the operation of the valve 52 to control the pressure level in air springs 38, 46.

More particularly, in the illustrated arrangement the height controller 52 includes a housing 58 fixedly secured to the air spring 46. It has an oscillatable cam 60 extending therefrom into chamber 47 where it engages the top of shock absorber 44 to sense the relative height portion between frame 12 and axle assembly 16. It includes an inlet 62 and an outlet 64.

Such a side mounted controller is representative of many height controllers suitable for use in the inventive system combination. It is a three position unit as is commonly the case and is damped against normal road movements between frame 12 and axle assembly 16.

For a better understanding of this kind of controller reference may be had to my copending application S.N. 835,398 filed June 23, 1969. An example of a frame mountable controller of this type is shown in U.S. Pat. No. 2,967,547 issued Jan. 10, 1961 to J. F. Pribonic. The details of these valves per se form no part of the present invention.

The system 50 further includes a supply conduit 66 having one end thereof connected to the interior of tank 54 and the opposite end thereof in fluid communication with the inlet in the housing 58. A side port 68 connects the interior of housing 58 to the pressurizable control chamber 47 of the air spring 46. It serves as a two way path for flow of pressurized fluid to the auxiliary suspension units 32, 40 and for the exhaust of pressurized fluid therefrom through three position valve means in controller 58, whereby the pressure level in the control chambers of the air spring components 38, 46 can be varied to produce an upward load supporting action in addition to that of the primary suspension springs 28 necessary to maintain the lower frame 12 at a predetermined height relationship with respect to the axle housing 18. This results in a desired trim height position of the vehicle 10 with respect to ground.

Figure 3:
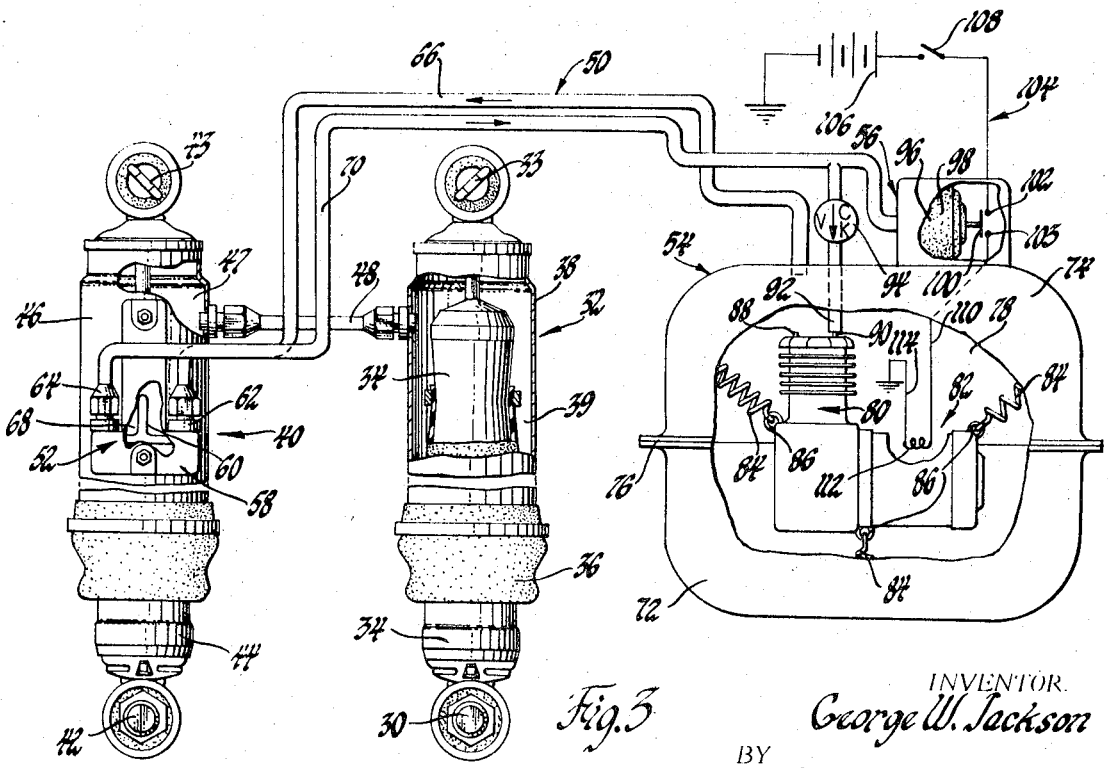

The system 50 further includes an exhaust conduit 70 having one end thereof connected to the outlet 64 in the housing 58 and the opposite end thereof connected to the pressurizable switch assembly 56 as is best seen in FIG. 3.

In addition to the fluid flow controlling action of the valve 52 the system 50 further includes means for controlling communication between the interior of the tank 54 with the supply conduit 66 and the exhaust conduit 70. Thus, referring more particularly to FIG. 3 it can be seen that the tank 54 is made up of a lower half 72 and an upper half 74 joined together at a belt line 76 by suitable means such as welding to hermetically seal a space 78 interiorly of the tank 54. Within the interior space 78 is located a reciprocating air compressor 80 that is driven by an electric motor 82.

The compressor 80 and motor 82 are integrally joined and supported in spaced relationship with the inside wall of the tank 54 by means of a plurality of tension springs 84 each having one end thereof connected to an eyelet 86 on either the compressor 80 or motor 82 and the opposite end thereof connected to like eyelets on the inside surface of the tank 54.

The springs 84 serve to locate the compressor and motor within the space 78 and also serve to isolate the compressor and motor vibrations from the tank 54.

The compressor 80 includes an outlet or discharge port 88 in direct communication with the interior space 78. It further includes an inlet or suction port 90 that communicates with one end of an inlet connection 92 which is communicated through a one-way valve 94 to the exhaust conduit 70.

The exhaust conduit 70 also is communicated with a pressure chamber 96 in switch assembly 56. The chamber 96 partially is defined by a movable diaphragm 98 having a switch element 100 operatively carried thereon which is movable with respect to normally open fixed contacts 102, 103 into opened and closed positions.

The element 98 and contacts 102, 103 constitute a pressure sensitive switch that is responsive to a build-up of pressure in conduit 70 to close an energization circuit 104 for motor 82. More particularly the circuit 104 runs from the positive terminal of a vehicle battery 106 through an ignition switch 108 to the assembly 56. A conductor 110 connects switch 56 to one side of a winding 112 in motor 82. The opposite side of winding 112 is connected by a conductor 114 to ground. Thus, when the ignition switch 108 is closed and the diaphragm 98 moves element 100 to bridge contacts 102, 103 the motor 82 will be energized to operate compressor 80.

A feature of the present inventive automatic leveling system 50 is the manner in which the system is manitained fail safe. First, if the air springs rupture and the controller 52 is conditioned to open communication between tank interior 78 and the springs 38, 46 the only effect is to dump the tank precharge through the rupture. The chamber 96 will be at ambient pressure and contacts 102, 103 will remain open. Hence, the motor 82 will be maintained de-energized.

Also, when the vehicle is level and a high pressure exists in tank 54 the check valve 94 prevents air leakage from the tank interior 78 through the discharge port 88, the compressor piston, the suction port 90 and the inlet connection 92 to the switch assembly 56. This prevents a false signal or pressure build-up in chamber 96 that could cause operation of the compressor 80 when the vehicle chassis is level.

The system operation constitutes three distinct phases including the following:

NEUTRAL OPERATION

When the vehicle is at a curb site location and unloaded the primary suspension springs 28 at the rear axle assembly and like components at the front of the vehicle will maintain the frame 12 generally parallel to supporting ground. At this point the three position height controller 52 has the cam 60 positioned to condition valving elements therein to block fluid communication between both the conduits 66, 70 and the side port 68. This traps fluid pressure in control chambers 39, 47. A description of a position wherein the inlet 62, outlet 64 and port 68 are blocked from one another is more specifically set forth in my above-mentioned copending application S.N. 835,398.

OVERLOAD OPERATION

When the vehicle static load is increased a predetermined deflection of the primary suspension springs 28 occurs that will cause movement of the rear part of the frame 12 downwardly with respect to the axle housing 18.

When this occurs the cam 60 is positioned to cause the controller 52 to have its valve means conditioned to open communication between the inlet 62 that is connected to the supply conduit 66 and the side port 68 into the control chambers 39, 47. Concurrently the outlet 64 connected to the conduit 70 is blocked. As a result, the interior 78 of the tank 54 is in direct communication with the control chambers of the auxiliary suspension units 32, 40 whereby both of the pressurizable air springs 38, 46 are inflated to produce an upward force on the lower frame 12 between it and the control arms 20, 22. This uplifting force supplements that of the primary suspension springs 28 to overcome the additional static load on the vehicle. The return of the vehicle chassis to its desired standing height relationship will cause the valve 52 to assume its neutral position wherein the pressurized air spring components 38 46 are blocked from the remainder of the closed loop system.

The aforedescribed correcting action is attained without any substantial degree when a precharged condition exists within the chamber 78.

PUMP DOWN

Under conditions when the vehicle is unloaded and the air springs are pressurized, the combination uplifting action of the air springs and coil springs 28 on the bottom frame member 12 can cause it to move upwardly of the axle housing 18 to a point above the desired height relationship.

Under this condition the controller 52 is conditioned to its valve means to block communication between the inlet 62 and side port 68 and to open communication between the outlet 64 and the port 68 in the housing 58 whereby the conduit 70 will be maintained in direct fluid communication with the control chambers 39, 47.

In accordance with certain principles of the present invention the high pressure air in the control chambers of the pressurizable air springs 38, 46 will be directed through the conduit 70 into the pressure chamber 96. The pressure build-up will act on the diaphragm 98 causing the aforedescribed movement of element 100 into bridging arrangement with contacts 102, 104.

Since the contacts 102, 104 are closed and assuming that the ignition switch 108 is also closed the motor energization circuit 104 is completed and the compressor is operated to pump down the air springs and concurrently build-up pressure in tank 54.

An important aspect of the invention is that the assembly 56 and controller 52 simultaneously supercharge the intake of the compressor while energizing the compressor. Hence, once the mechanically operated controller 52 directly communicates the port 68 with the conduit 70 the system 50 will be operated to quickly pump compressed air from the pressurizable air springs 38, 46 and discharge it through the compressor outlet 88 into the tank interior 78. Concurrently the controller 52 blocks communication between port 68 and conduit 66. Accordingly air being discharged from the outlet port 88 is retained in the interior 78 for subsequent use in the system.

In one working embodiment of the aforedescribed system the component parts of the system have the following mechanical and electrical ratings under operating conditions.

I claim:

1. An automatic leveling system for an automotive vehicle of the type including a chassis supported by a primary suspension spring component with respect to a ground supported axle assembly comprising: auxiliary fluid spring means adapted to be connected between the vehicle chassis and the axle assembly to produce a supplemental load carrying action to correct changes in deflection of the primary suspension spring component, a high pressure fluid storage tank. means including a height controller for directing high pressure fluid from said storage tank interiorly of said fluid spring means when the chassis is loaded to deflect the main suspension spring thereby to increase the pressure level in said fluid spring to return the chassis to a predetermined position, a compressor including an outlet in direct communication with the interior of said storage tank and an inlet, means including said height controller and an exhaust conduit for communicating said fluid spring means with said compressor inlet and operative when the chassis moves above a predetermined level position with respect to the axle assembly to cause said fluid spring means to supercharge said compressor inlet, electric motor means connected to said compressor for operating said compressor to discharge fluid into said storage tank for precharging it with fluid from said fluid spring means during a pump down phase of operation, and pressure switch means sensing the supercharged condition at said compressor inlet and operative to connect said electric motor means to a power source whereby said compressor will pump down said fluid spring means and discharge fluid therefrom interiorly of said storage tank during the pump down phase until the vehicle chassis is returned to its level position, said height controller including means operative during said pump down phase for isolating the interior of said storage tank from said auxiliary spring means.

2. An automatic vehicle leveling system for a vehicle having a sprung mass supported on an unsprung mass by a primary suspension spring comprising: auxiliary fluid spring means, a closed loop pressurization system for controlling the pressure level in said fluid spring means including a pressurizable container, a compressor having an inlet and outlet, said compressor outlet directly discharging into said container for producing a predetermined pressure in said container for rapidly inflating said fluid spring means, a height controller interposed between said pressurizable container and said fluid spring means operative to sense movement of the spring mass below a desired height relationship with respect to the unsprung mass to divert pressurized fluid within said container into said fluid spring means for obtaining rapid pressurization thereof to return the sprung mass to the desired height relationship, said height controller including means for dumping fluid from said fluid spring means when the unsprung mass moves above the unsprung mass, an exhaust conduit connecting said height controller to said compressor for supercharging the inlet of said compressor when the sprung mass is moved above the desired height relationship, electric motor means for driving said compressor, pressure switch means for sensing the pressure in said exhaust conduit and operative to connect said electric motor means across a power source when said compressor inlet is so supercharged to energize said compressor causing it to pump pressurized fluid from said fluid spring means and discharge it interiorly of said container for subsequent use, said height controller blocking communication between said pressurized container and said fluid spring means as it is being pumped down and being operative when the unsprung mass is at the desired height relationship with respect to the sprung mass to completely isolate said fluid spring means from the remainder of said closed loop pressurization system.

3. An automatic vehicle leveling system for association with an automotive type vehicle having a sprung mass supported on an unsprung mass by a primary suspension spring system that deflects in response to load changes to shift the sprung mass of the vehicle from a predetermined standing height position comprising: fluid spring means adapted to be connected between the sprung and unsprung masses of the vehicle in parallel with the primary suspension spring, a high pressure supply container, three position valve means for sensing the attitude of the sprung mass with respect to the unsprung mass including an inlet, an outlet and means in communication with said fluid spring means, first conduit means communicating the interior of said container with said valve means inlet, a compressor having an inlet and an outlet directly discharging pressurized fluid into said supply container, second conduit means communicating said compressor inlet with said valve means outlet, electric motor means for operating said compressor, switch means for electrically connecting said motor means to a power source, a pressure sensitive component in said second conduit means for sensing a predetermined pressure buildup therein to operate said switch means so as to energize said electric motor means thereby to operate said compressor causing it to draw fluid from said second conduit means and discharge it interiorly of said container, said three position valve means including first, second and third operative positions corresponding to a level sprung mass, a below level sprung mass and an above level sprung mass respectively, said valve means in its first position blocking fluid flow between said supply container and said fluid spring means and further blocking fluid flow between said fluid spring means and said second conduit means, said valve means in its second position directly communicating the interior of said container with said fluid spring means thereby to cause a pressure increase in said spring means causing it to supplement the load supporting action of the primary spring component to return the sprung mass to its level position, said valve means in its third position communicating said fluid spring means with said compressor inlet, said pressure responsive component sensing pressure in said second conduit means when said valve means is in its third position to condition said switch means to energize said compressor, said compressor operating when said valve means is in its third position and said switch means is so conditioned to draw pressurized fluid from said second conduit means and said fluid spring means to cause the said fluid spring means to be deflated a predetermined degree to return the sprung mass to its predetermined desired level position.

4. A leveling system for making corrections for standing height changes of a vehcile chassis supported by a primary suspension spring on an axle assembly comprising: fluid spring means pressurizable to carry additional loading on the vehicle chassis to maintain a predetermined standing height position, a high pressure storage container, means including a height control valve and a supply conduit for communicating said fluid spring means with said storage tank when the vehicle chassis is loaded to move below its predetermined standing height position, said storage tank and said fluid spring means having a predetermined volume ratio therebetween whereby fluid in said storage tank will raise the pressure level in said fluid spring means to quickly return the vehicle chassis to its level standing height position, a compressor including an inlet and an outlet in direct communication with the interior of said container, means including said height control valve and an exhaust conduit for supercharging said compressor inlet with fluid from said fluid spring means, electric motor means for driving said compressor, electric switch means including a pressure responsive component sensing the pressure in said exhaust conduit, said height control valve means directly communicating said exhaust conduit with said fluid spring means and blocking communication between said fluid spring means and the interior of said storage container when the vehicle chassis moves above its level standing height position, said pressure responsive component sensing a pressure increase in said exhaust conduit to condition said switch means for connecting said electric motor means across a power source thereby causing said motor to drive said compressor to draw fluid from its precharged intake for discharge into said storage container, said height control valve blocking communication between said fluid spring means and said return component when the vehicle chassis has returned to its level standing height position, said pressure responsive component of said switch means maintaining said compressor energized until pressure in said exhaust conduit reaches a predetermined minimum point, valve means between said compressor inlet and said exhaust conduit for blocking fluid flow from said compressor inlet into said exhaust conduit when said compressor is de-energized thereby to block flow of high pressure fluid in said storage tank through said compressor and into said return conduit to prevent a pressure level in said pressure switch capable of producing energization of said electric motor means other than by said height control valve opening communication between said fluid spring means and said exhaust conduit.

References Cited

UNITED STATES PATENTS

| | | | |
|---|---|---|---|
| 3,071,394 | 1/1963 | Miller | 280—124(F) |
| 3,082,018 | 3/1963 | Smirl | 280—124(F) |
| 3,120,962 | 2/1964 | Long | 280—6(H) |

PHILIP GOODMAN, Primary Examiner